United States Patent

[11] 3,536,100

[72] Inventors Darrell W. Marlow
  Herrin, and
  John Shum, Jr., Johnston City, Illinois
[21] Appl. No. 781,419
[22] Filed Dec. 5, 1968
[45] Patented Oct. 27, 1970
[73] Assignee Olin Corporation
  a corporation of Virginia

[54] VALVE
  6 Claims, 3 Drawing Figs.
[52] U.S. Cl. .................................................. 137/625.47,
  251/175
[51] Int. Cl. ..................................................... F16k 11/08
[50] Field of Search ........................................... 251/175;
  137/625.41; 251/310, 251/309; 137/625.47

[56] References Cited
  UNITED STATES PATENTS
1,138,613 5/1915 Arndt ............................ 251/310

FOREIGN PATENTS
613,430 4/1935 Germany ...................... 137/625.47

Primary Examiner—M. Cary Nelson
Assistant Examiner—Michael O. Sturm
Attorneys—H. Samuel Kieser, William W. Jones, Richard S. Strickler, Robert H. Bachman, Donald R. Motsko and Thomas P. O'Day ABSTRACT: A valve of the type having a rotor rotatable to connect any one of two outlets with an inlet, said rotor being mounted in the body so that it can float in a direction perpendicular to the axis of the inlet. A segment of the outside wall of the rotor opposite its outlet has a diameter equal to the internal diameter of the valve body. A second segment opposite said first segment is greater than 180° and is generated about an axis offset with respect to the axis of the first segment in a direction away from the outlet of the rotor.

Patented Oct. 27, 1970

3,536,100

INVENTORS
DARRELL W. MARLOW
JOHN SHUM JR.

BY H. Samuel Kieser

ATTORNEY

VALVE

This invention relates generally to valves. More particularly, this invention relates to a rotary valve having a rotor rotatable to connect any one of two outlets with an inlet.

There are some circumstances where it is desirable to be able to switch a source of high temperature fluid back and forth between one of two given flow paths. An example of such a system is an engine starting system wherein there are two adjacent engines each provided with its own starting motor. If the starting motor is of the type that is driven by a high temperature gas such as that generated from a propellant cartridge and if no switching means are available, it would be necessary to provide two breeches for actuation of the propellant cartridges, one for each starting motor.

The present invention is directed to a valve particularly adapted for the above-mentioned type of system wherein the gas generated by the ignition of a propellant cartridge in a single breech can be directed to any one of two flow paths.

This invention has for one of its objects the provision of an improved switching valve for use with high temperature, corrosive media.

Another object of this invention is to provide a valve housing an improved rotor designed to improve the sealing of the closed outlet.

A further object of this invention is to provide a switching valve which is designed to compensate for the relative differences in thermal expansion between the rotor and the valve body.

Yet another object of this invention is to provide a reliable and relatively inexpensive valve for use with high temperature media.

These and other objects and advantages of the invention will become more apparent by reference to the following description of a preferred embodiment and to the accompanying drawings in which.

Figure 1:
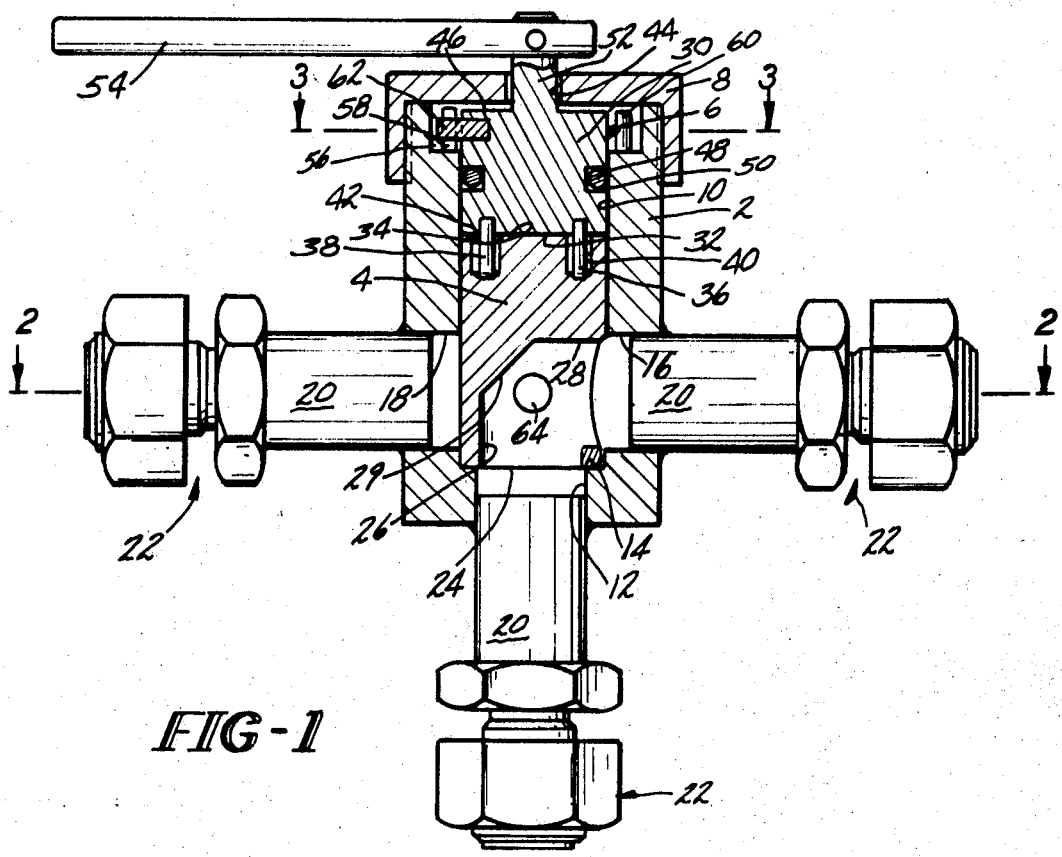
FIG. 1 is a vertical, cross-sectional view of a valve designed in accordance with the present invention.

As shown in the drawings, a valve constructed in accordance with the present invention includes a valve body 2, a rotor 4 mounted in the valve body 2, an actuating mechanism 6, and a cap 8 covering the upper end of the valve body 2.

The valve body 2 has a vertically extending, cylindrical bore 10 extending therethrough. The lower end portion of the bore 10 is reduced to form an inlet port 12 and a horizontally disposed seat 14. The valve body 2 is also provided with two outlet ports 16 and 18 in the side wall of the body 2. The outlet ports 16 and 18 are spaced 180° apart with their common axis perpendicular to the axis of the inlet port 12. The inlet port 12 as well as both outlet ports 16 and 18 may have a conduit 20 provided with a coupling 22 to provide means for attaching the valve to the system conduits. The conduits 20 may be attached to the valve body 2 by any suitable means such as welding or the like.

The rotor 4 is mounted in the bore 10 of the valve body 2 with its bottom surface 24 resting on the seat 14. An inlet 26 is provided in the rotor 4 and has an axis coincident with the axis of the inlet port 12 and communicates therewith. An outlet 28, in communication with the inlet 26, is also provided in the rotor 4. The outlet 28 has an axis which lies in the same plane as the common axis of the outlet ports 16 and 18 in the valve body 2. A portion 29 of the internal surface between the inlet 26 and outlet 28 of the rotor 4 is tapered at about 45° with respect to the axis of the inlet 26 and outlet 28 so that the fluid passing therethrough impinges upon said surface to apply a force to the rotor having a component tending to move the rotor toward the outlet port 18 in the valve body 2 to be sealed and away from the outlet port 16 with which the outlet 28 of the rotor 4 is in communication.

Figure 2:
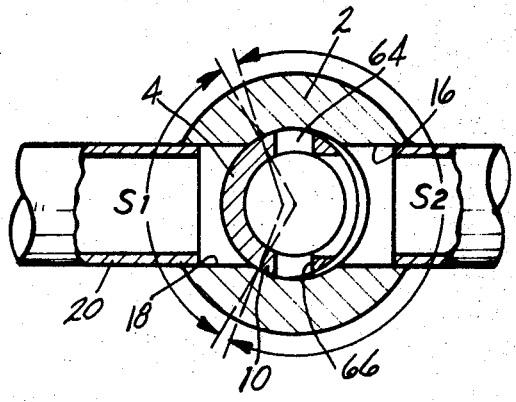
FIG. 2 is a horizontal, cross-sectional view taken along the lines 2–2 of FIG. 1.

Referring to FIG. 2, in the preferred embodiment of the invention the radius of the outer wall of the rotor 4 over segment $s_1$ is the same as that of the bore 10 of the valve body 2 and is generated about the axis of the bore 10. The segment $S_1$ is less than 180°. The radius of the wall of rotor 4 over segment $S_2$ is smaller than that of the bore 10 and is generated about an axis offset from the axis of the bore 10 of the valve body 2 in a direction away from outlet 28. Preferably segment $S_2$ is greater than 180°. The important consideration is that the portion of the outer wall of the rotor 4 opposite the outlet 28 should have a diameter equal to the diameter of the bore 10 and some clearance should be provided on the outlet side of the rotor 4 when the opposite side is in contact with the wall of the bore 10. The clearance should extend about the rotor 4 a sufficient distance so that the rotor 4 can float.

The actuating mechanism 6 includes a turning member 30 which is inserted into the bore 10 at the upper end thereof until its bottom face 32 rests on the top face 34 of the rotor 4. Two dowel members 36 and 38 extend from the bottom face 32 of the turning member 30 into oversize openings 40 and 42 in the top of the rotor 4 to provide means for imparting rotation of the turning member 30 to the rotor 4.

The cap 8 has a central aperture 44 and is threadedly secured to the top of the valve body 2. A slight clearance is provided between the inner surface of the cap 8 and a shoulder 46 on the turning member 30. As the turning member 30 rests on top of the rotor 4 and the bottom of the rotor 4 in turn rests on seat 14, the rotor is limited in the amount of movement in an an axial direction. If no clearance were provided between the cap 8 and the turning member 30, the force required to rotate the turning member could be too great. In addition, the clearance is required to permit the rotor 4 to float freely in a radial direction.

An O-ring 48 is mounted in a circumferentially extending groove 50 in the outer surface of the rotor 4 and is in sealing engagement with the bore 10 of the valve body 2 to inhibit leakage of the fluid past the turning member 30. The O-ring 48 may be fabricated from any suitable elastomeric material capable of withstanding the high temperatures of the fluid.

A projection 52 extends from the turning member 30 through the aperture 44 in the cap 8. Suitable actuating means may be attached to the projection 52. As shown in FIG. 1, such actuating means may be in the form of a handle 54. However, it is to be understood that the valve can be actuated by means of a commercially available rotary actuator, a commercially available piston and cylinder type actuator provided with suitable linkage, or a rack and pinion arrangement.

Figure 3:
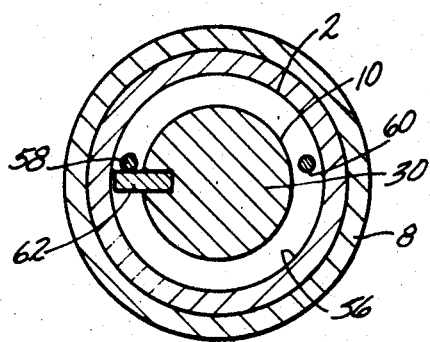
FIG. 3 is a horizontal, cross-sectional view taken along the lines 3–3 of FIG. 1.

As shown in FIGS. 1 and 3, the upper portion of the body 2 is counterbored to provide a circumferentially extending groove 56. Two dowels are mounted in the groove 56 in a direction parallel to the axis of the bore 10 and are circumferentially spaced to provide two stops 58 and 60. A stop member 62 in the form of a dowel or the like extends radially outwardly from the side of the turning member 30. The stops 58 and 60 are so positioned with respect to the stop member 62 such that when the stop member 62 is in abutment with the stop 58, the outlet 28 of the rotor 4 is aligned with the outlet port 16 in the valve body 2. If the rotor 4 were turned 180° until the stop member 62 is in engagement with the stop 60, the outlet 28 of the rotor 4 will be aligned with the outlet port 18 of the valve body 2.

As stated above, in the preferred embodiment of the invention, the outer surface of the rotor 4 is defined by segment $S_2$ is greater than 180°. This fact, coupled with the fact that the openings 40 and 42 into which the dowels 38 extend are oversized, permits the rotor 4 to float in a direction perpendicular to the axis of the bore 10. Accordingly, when a fluid passes through inlet port 12 in the valve body 2 through the inlet 26 of the rotor 4, the force of the fluid against the internal surface of the rotor, including portion 29, urges the portion of the rotor wall defined by segment $S_1$ into tight engagement with the portion of bore 10 opposite the outlet 28. This insures a tight seal to prevent the fluid from passing through the closed outlet. By virtue of the fact that the wall of the rotor 4 defined by segment $S_2$ is generated about an axis offset with respect to the bore 10 of the valve body 2, a space is provided to compensate for the relative thermal expansion between the rotor 4 and valve body 2.

Two small bleed holes 64 and 66 are provided in the rotor 4 and are spaced 90° from the rotor outlet 28 and 180° from each other. The bleed holes 64 and 66 allow the fluid to bleed into both outlet ports 16 and 18 in the event that the rotor 4 is inadvertently rotated to a point where the outlet 28 thereof is not in communication with one of the two outlet ports 16 and 18 in the valve body 2.

We claim:

1. A valve for use with high temperature fluids, said valve comprising a body having a cylindrical bore therein and provided with first, second and third ports, each of said first and second ports having an axis lying in a common plane perpendicular to the axis of said bore, and said third port having an axis perpendicular to the common plane of said first and second ports, a rotor mounted in said valve body, said rotor having a flow channel therethrough, one end of said flow channel being in communication with said first port and the other end being movable between a first position wherein it is in communication with said first port and a second position wherein it is in communication with said second port, a segment of the outer wall of said rotor opposed to said one end of said flow channel having a diameter equal to the diameter of said bore, said first segment being less than 180° a segment of the wall of said rotor greater than 180° adjacent said one end of said flow channel being spaced from the wall of said bore when said first segment is flush with the bore in said body, and means mounting said rotor in said body so said rotor can float in a direction perpendicular to the axis of said third port.

2. The valve of claim 1 wherein the axis of said first and second ports are spaced circumferentially 180° about the body of said valve.

3. The valve of claim 2 wherein said flow channel has a surface inclined with respect to the axes of all of said ports.

4. The valve of claim 2 further including stop means for limiting the rotation of said rotor between a point wherein said other end of said flow channel is in communication with said first port and a point wherein said other end of said flow channel is in communication with said second port.

5. The valve of claim 4 further including means for limiting the axial movement of said rotor within said bore.

6. The valve of claim 5 wherein said body includes a seat adjacent the bottom of said bore, said rotor having a bottom surface resting on said seat, and further including a turning member mounted in said bore above said rotor, either said rotor or said turning member having a plurality of projections extending therefrom, the other of said rotor or said turning member having projection receiving holes into which said projections extend, said projection receiving holes being larger than said projections to permit said rotor to float, and a cap member having a central aperture secured to the top of said body and spaced from said turning member, said turning member being provided with a projection extending outwardly from said body through said aperture.